(12) United States Patent
Bailey

(10) Patent No.: US 7,475,613 B2
(45) Date of Patent: Jan. 13, 2009

(54) MULTI-AXIS SPINDLE HEAD

(75) Inventor: Ralph-Peter Steven Bailey, Nr Steyning (GB)

(73) Assignee: Shin Nippon Koki Co., Ltd., Tokyo (JP)

( * ) Notice: Subject to any disclaimer, the term of this patent is extended or adjusted under 35 U.S.C. 154(b) by 654 days.

(21) Appl. No.: 10/432,052

(22) PCT Filed: Oct. 26, 2001

(86) PCT No.: PCT/GB01/04758

§ 371 (c)(1),
(2), (4) Date: May 19, 2003

(87) PCT Pub. No.: WO02/34460

PCT Pub. Date: May 2, 2002

(65) Prior Publication Data

US 2004/0035234 A1 Feb. 26, 2004

(30) Foreign Application Priority Data

Oct. 26, 2000 (GB) ................................ 0026234.5

(51) Int. Cl.
*B25J 17/00* (2006.01)
(52) U.S. Cl. .................. 74/490.05; 248/181.1; 248/663
(58) Field of Classification Search ............... 74/490.01, 74/490.03, 490.05, 490.06, 490.07, 490.1; 248/181.1, 663
See application file for complete search history.

(56) References Cited

U.S. PATENT DOCUMENTS

| 2,823,591 | A | * | 2/1958 | Craddock et al. ........... 409/190 |
| 4,332,147 | A | | 6/1982 | Grech |
| 4,569,627 | A | * | 2/1986 | Simunovic ................. 414/735 |
| 4,628,765 | A | | 12/1986 | Dien et al. |
| 4,723,460 | A | * | 2/1988 | Rosheim .................. 74/490.06 |
| 4,776,749 | A | * | 10/1988 | Wanzenberg et al. ........ 414/680 |
| 4,878,393 | A | * | 11/1989 | Duta et al. ............... 74/490.06 |
| 4,919,382 | A | * | 4/1990 | Forman .................... 248/178.1 |
| 4,951,521 | A | | 8/1990 | Jacobson |
| 5,410,944 | A | | 5/1995 | Cushman |
| 5,466,085 | A | * | 11/1995 | Sheldon et al. ............. 409/201 |

(Continued)

FOREIGN PATENT DOCUMENTS

DE 198 45 932 A1 4/2000

(Continued)

OTHER PUBLICATIONS

K. Lee et al., "Kinematic Analysis of a Three-Degrees-Of-Freedom Spherical Wrist Actuator", Mechatronics, Pergamon Press, vol. 4, No. 6, Sep. 1994, pp. 581-605.

*Primary Examiner*—Robert A Siconolfi
*Assistant Examiner*—Matthew Johnson
(74) *Attorney, Agent, or Firm*—Connolly Bove Lodge & Hutz LLP; Myron Keith Wyche

(57) ABSTRACT

A powered mechanism able to articulate about two orthogonal tilt axes, the powered mechanism having a sphere pivotally mounted in a ring or band and driven by a first pivotally mounted motor to articulate the sphere about the first axis, and a second pivotally mounted motor mounted to a fixed reference to drive the sphere about the second axis through ring or band.

8 Claims, 4 Drawing Sheets

U.S. PATENT DOCUMENTS

| | | | |
|---|---|---|---|
| 5,533,418 A * | 7/1996 | Wu et al. | 74/490.06 |
| 5,575,597 A * | 11/1996 | Bailey et al. | 409/201 |
| 5,584,621 A * | 12/1996 | Bertsche et al. | 409/201 |
| 5,797,191 A * | 8/1998 | Ziegert | 33/503 |
| 5,807,044 A * | 9/1998 | Watari et al. | 409/201 |
| 5,857,815 A * | 1/1999 | Bailey et al. | 409/201 |
| 5,893,296 A * | 4/1999 | Rosheim | 74/490.03 |
| 5,966,991 A * | 10/1999 | Gosselin et al. | 74/490.1 |
| 5,979,264 A * | 11/1999 | Rosheim | 74/490.06 |
| 6,026,703 A * | 2/2000 | Stanisic et al. | 74/490.06 |
| 6,071,031 A * | 6/2000 | Bailey | 403/57 |
| 6,227,776 B1 * | 5/2001 | Kitamura et al. | 409/159 |
| 6,447,224 B2 * | 9/2002 | Mitsuzono et al. | 409/201 |
| 6,497,548 B1 * | 12/2002 | Roy et al. | 414/735 |
| 6,503,033 B1 * | 1/2003 | Kim et al. | 409/201 |

FOREIGN PATENT DOCUMENTS

| | | |
|---|---|---|
| DE | 198 50 603 A1 | 5/2000 |
| JP | 07-035214 | 2/1995 |
| JP | 09-300148 | 11/1997 |
| JP | 10-109285 | 4/1998 |
| JP | 2001-071285 | 3/2001 |
| WO | WO-9641695 | 12/1996 |
| WO | WO-98-21545 | 5/1998 |

* cited by examiner

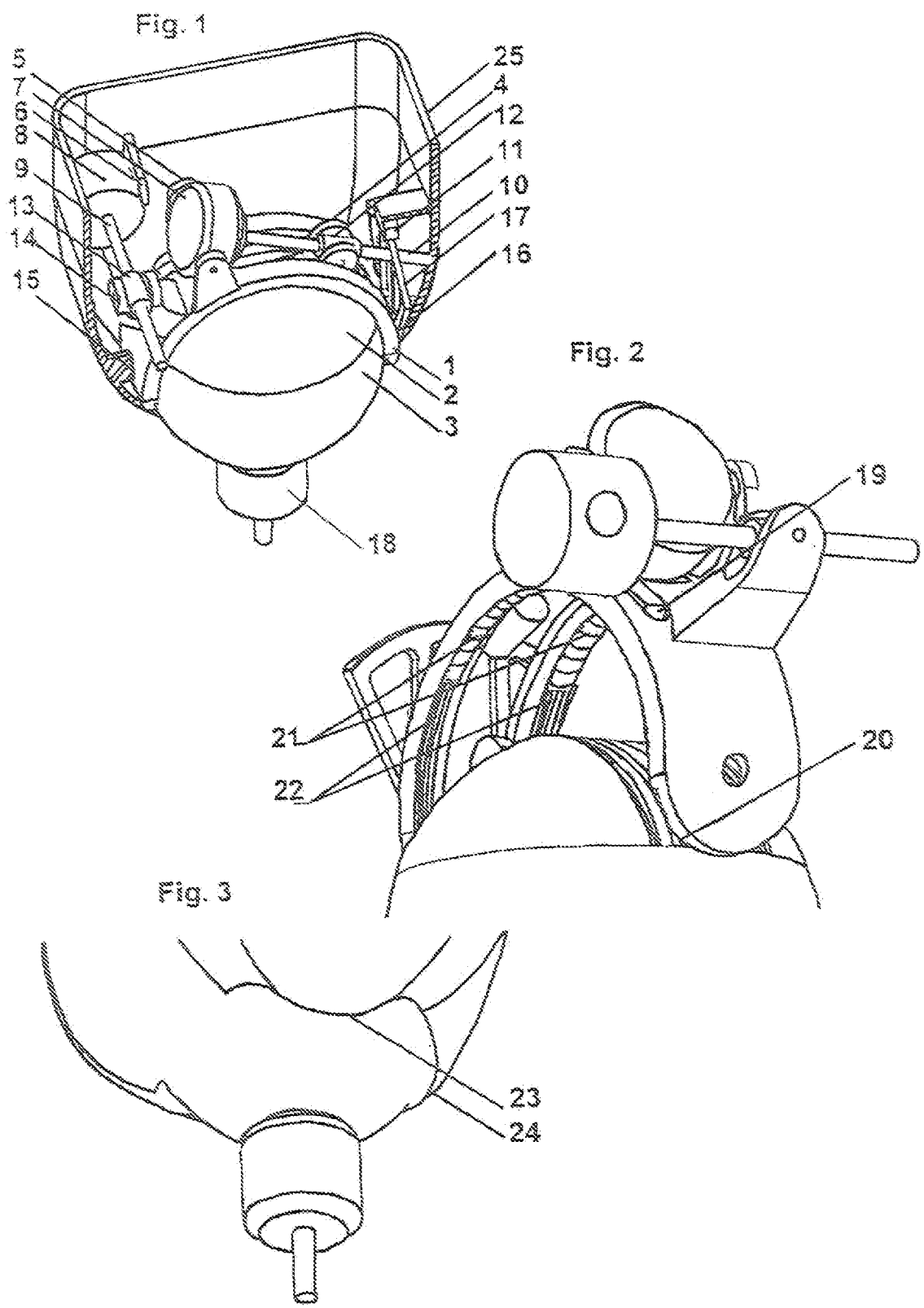

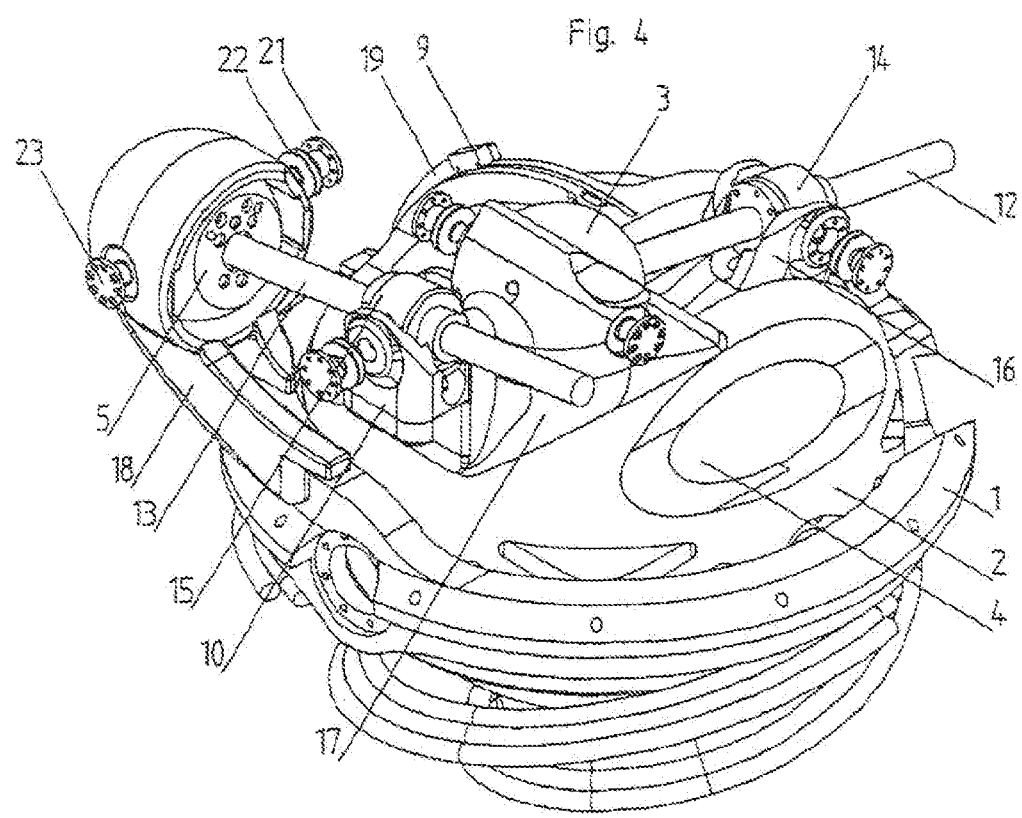

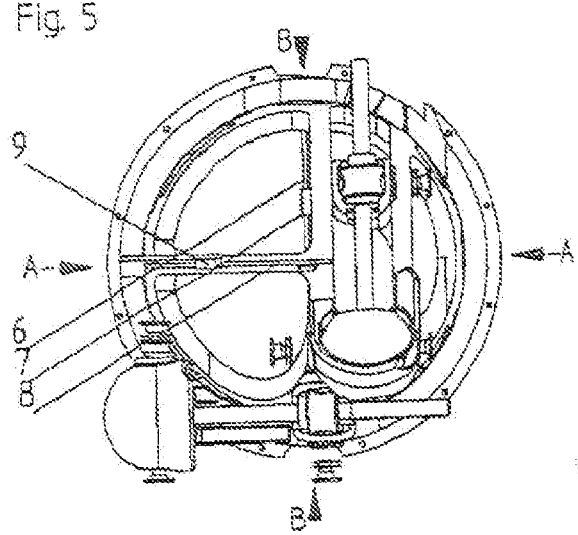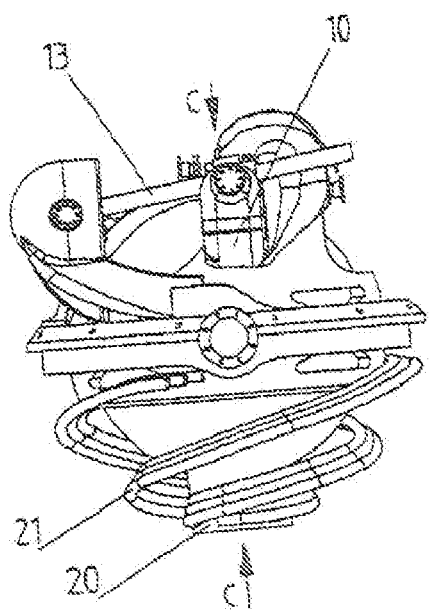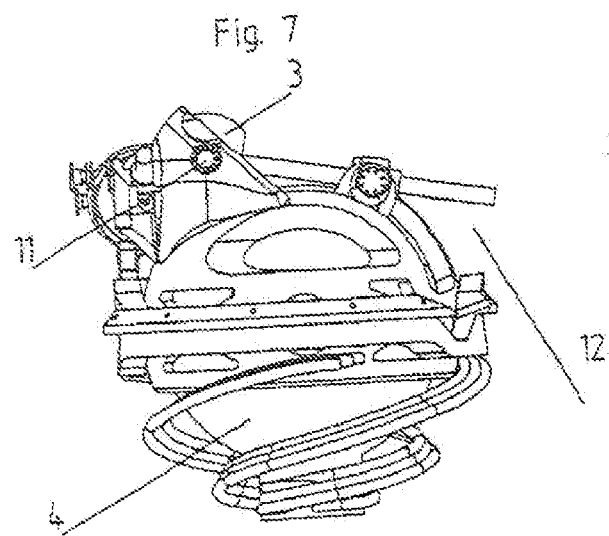

MULTI-AXIS SPINDLE HEAD

FIELD OF THE INVENTION

This invention relates to a powered mechanism such as a spindle head and more particularly, but not exclusively, concerns a multi-axis spindle head.

BACKGROUND OF THE INVENTION

With the increasing ability of designers using CAD systems to specify complex surfaces, there is a similar need for machine tools to articulate about all 5 degrees of freedom to render these surfaces in metals.

Currently most machine mills move the spindle along 3 Cartesian axes, with the 2 axes tilt of the spindle not supported. It would be desirable to substitute the usual fixed axis spindle with one able to additionally tilt in 2 axes such as to upgrade 3 axis machines to 5 axes.

Many solutions to this need have been proposed, however all are compromises involving accuracy, stiffness, compactness and complexity.

OBJECTS AND SUMMARY OF THE INVENTION

The principal object of the present invention is to overcome or at least substantially reduce some at least of the drawbacks of known spindle heads.

It is another object of the present invention to prescribe a new means of articulating a spindle in 2 axes about a common focal point. It is another object or the present invention to avoid the mechanical complexity of traditional geared rotary stages by use of push rods acting against cranks to effect the rotations. This enables low cost ball screws to be employed.

In broad terms, the present invention resides in the concept of taking advantage of a novel multi-axis spindle head design to provide movement about two orthogonal tilt axes, thereby enabling the spindle head design to have additional degrees of movement over known spindle head designs.

Thus, according to the present invention, there is provided a powered mechanism able to articulate about two orthogonal tilt axes wherein means retained by a notional ring or band is constrained such that it can only rotate about the axis of the notional ring or band and with motive source to displace one with respect to the other, and the notional ring or band is also able to pivot about an orthogonal intersecting axis when motive source is applied from a reference position, the mechanism providing an output orthogonal to and intersecting the other two tilt axes.

Advantageously, this invention splits up the 2 axis into mechanically independent systems in the manner of a gimbal. Driven push rods can then power each movement axis, and encoders can be located around these axes in order to measure their absolute degree to rotation.

In an embodiment of the invention which is described in detail hereinafter a spindle unit is located within a notional sphere, and means are provided to articulate the sphere. One axis is supported by a band running around the sphere and keyed into the sphere such that it can only move around one latitude. This band is pivotally supported by bearings whose common axis intersects the sphere focal point. A servo motor is attached to the band with a ballscrew extending in the motor axis. The ballscrew runs through a nut otherwise retained to the sphere. Both motor unit and nut support are pivotally supported. As the motor rotates the screw, the nut is displaced along it, in turn rotating the sphere with respect to the band and in a common axis. An encoder strip is placed around the sphere and a read head is located on the band to determine angular displacement.

The other axis is also enabled by a further motor and push rod system acting from a fixed reference on the unit housing and pushing against the band via a short crank arm. The band is thereby caused to rotate about its support pivot axis and in turn rotates the sphere by virtue of being keyed into a latitudinal track as explained above. A further encoder track is supported by an arc segment with a common pivot axis to the band. A read head is retained by the housing and overhangs this track such that it can measure its angular displacement.

The band can advantageously have actively opposed segments such that it retains itself around the sphere. The sphere will then be entirely supported by the band pivot axes. Alternatively the band can serve to push the sphere into an annular socket. In this case the socket acts to establish the spheres focal point Cartesian position, with the band arranged to "float" with respect to the housing around the sphere but still applying downward preload.

In another embodiment which is also described in detail hereinafter a gimbal based 2 axis articulation stage comprises a mounting ring that pivotally supports a gimbal ring which in turn pivotally supports the spindle unit on an orthogonal axis.

Drive units are then arranged to push/pull from the mounting ring to the gimbal ring, and from the gimbal ring to the spindle unit. The push/pull action causes rotation about the respective pivot axes thereby effecting the 2 axis tilt of the spindle unit.

The two drive units are arranged in a "T" configuration to avoid interference during articulation and to minimize the overall package size.

The degree of tilt can be conveniently measured from encoder tracks mounted on a radial section of the spindle unit and on the gimbal ring. By locating the tracks equatorially centered about their respective pivot axes the system is relatively immune from axial displacement errors and with suitably located encoder read modules delivers accurate absolute radial displacement values.

The mechanical arrangement comprises a small number of compound parts that can be cost effectively produced from castings with limited finish machining. Firstly a mounting ring that can be extended to become the unit housing and supports a pivot axis, a drive unit and an encoder read module. Then a gimbal ring supports two pivot axes, a drive unit, a push point, an encoder track and an encoder read module. Finally a spindle unit supports a pivot axis, a push point and an encoder track and the spindle mechanism. Of course these parts can be made out of separate components for ease of manufacture if preferred.

The two pivot axes between the spindle unit and gimbal ring, and gimbal ring and mounting ring can be arranged such that when preloaded they both try to either open up or compress the gimbal ring. This minimizes any distortion of the gimbal under load as it is harder to bend it into a 'square' than to squash it into an ellipse. To effect this the internal mounting between gimbal and sphere should be push based, and the external mounting between gimbal and mounting ring pull based—or vice versa.

The services to the spindle unit also have to articulate about the two tilt axes. So as not to interfere with the tilt mechanism, this is most conveniently done on the underside of the mounting ring. To support the articulation an appropriate arrangement is to form the services power, air and fluid connections along a spiral pathway from the end of the spindle following a spherical profile to the underside of the mounting ring. The spiral can then compress about any net tilt axis.

The above and further features of the invention are set forth with particularity in the appended claims and will be described hereinafter with reference to exemplary embodiments which are illustrated in the accompanying drawings.

DESCRIPTION OF THE DRAWINGS

FIG. 1 is a perspective view of a first embodiment of the present invention, partly in section;

FIG. 2 is an enlarged perspective view of the first embodiment with the spindle sphere displaced to reveal details that otherwise would be obscured;

FIG. 3 is an enlarged, fragmentary perspective view showing details of the seating of the spindle sphere of the first embodiment;

FIG. 4 is a perspective view showing a second embodiment of the present invention;

FIG. 5 is a top plan view of the second embodiment, shown to a reduced scale;

FIGS. 6 and 7 are front and side elevation views of the second embodiment, again shown to a reduced scale.

DETAILED DESCRIPTION OF THE EMBODIMENTS

Figure 8:
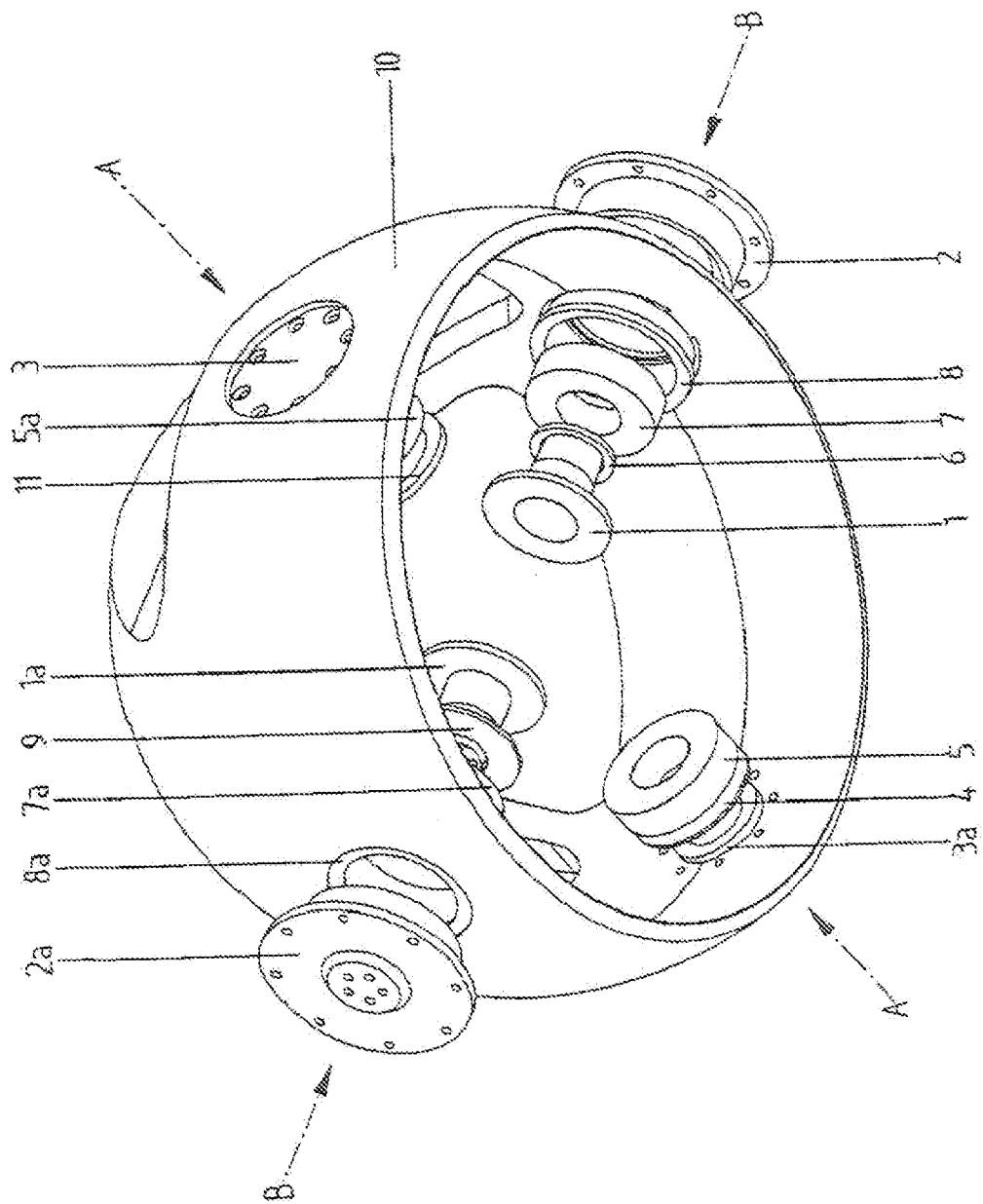
FIG. 8 is an enlarged perspective view of the gimbal ring of the second embodiment, the gimbal ring mounting the spindle sphere and itself being mounted in the mounting ring.

Referring to FIGS. 1 to 3 which show a first embodiment of the invention, a rotary spindle 18 is mounted to a sphere 3 which is mounted for articulation in two orthogonal directions, a first of which is accommodated by mounting of the sphere 3 to an arcuate band 1 with the sphere being movable in one direction relative to the band by virtue of the provision of a sphere tilt motor 7 which is mounted on the band and drives the sphere. The band 1 is in turn arranged to be movable in an orthogonal direction by virtue of being pivotally mounted in a housing 25 with a band tilt motor 5 mounted in the housing and driving the band 1. The bottom of the sphere 3 is journalled a spherical socket defined in the housing 25, with the spindle 18 projecting through a window in the housing.

The band 1 is semi-circular extending to house pivot bearings 15 in its longitudinal axis. It has circumferal underside grooves 22 that act as ball bearing raceways. Conforming raceways are located in the top of the sphere 3. The balls are retained by a cage that looks like an arc segment with a subtended angle that is smaller than the effective raceway by half the maximum articulation angle. This ensures that the ball cage assembly 21 can roll around between its raceways 22 without overlapping them at its limits. The top cap 2 of the articulating sphere 3 is of a size such that when at full articulation it still does not interfere with the support socket rim. The lower segment of the sphere needs to be prepared to a good sphericity to ensure good maintenance of focal point when articulating around the socket.

More than one raceway can be employed but always sharing the same pivot axis. The band 1 can be pre-loaded against the sphere 3 from its pivot axes 15 by means (not shown) such as an elastomeric bearing support or externally arranged downward preload on the bearing axles. Alternatively, the band could be preloaded by an opposing bearing raceway caused to move along the common axis by a means that applies pressure around its rim. This latter arrangement would have the stiffness advantage of two tracks, without requiring high engineering precision or risking over-constraining the two ball tracks resulting in spatial instability.

A mounting bracket 5 is added to the band 1 to pivotally retain the sphere tilt motor 7. The pivot is necessary to accommodate changes in angle as a ballscrew 10 follows the circumference of the sphere 3. The motor core is attached to the ballscrew 10 and held in bearings that prevent its axial displacement. Tile ballscrew 10 then extends out in the motor axis. A ballnut 12 rides on the screw 10 and is pivotally retained to a short crank arm 4 extending from the sphere 3. Suitable cut-outs in the sphere and the band permit the displacement of the screw and rotation of the crank arm.

The sphere 3 has an accommodation for a readable scale 20 to be fitted. This must extend around the sphere by a subtended angle greater than the expected maximum tilt angle. A read head 19 is retained on the band 1 such that it can read the scale 20.

A mounting bracket is provided on the band 1 to act as a crank arm 14 pivotally supporting a further captive ballnut 13. In this case the band tilt motor/ballscrew unit 8 is pivotally supported by a bracket 6 on the housing 25. In operation it therefore displaces the band 1 with respect to the housing 25 and can then only rotate about its pivot axis-rotating the sphere 3 with it.

A further readable scale 17 is attached to the circumference of an arc segment 16 with a defined pivot axis that can be brought co-axial with the band pivot axis. A reader 11 is retained on a bracket otherwise attached to the housing 25 such that it can read the scale and consequently measure the displaced angle of the band about the common pivot axis.

Instead of employing a servo driven push rod system where the nut is captive and the screw shaft is rotated, the nut could alternatively be rotated by the motor causing the screw shaft to be driven through it. In this case the end of the screw shaft would be pivotally retained by the crank arms and a spatial accommodation would need to be made to permit the screw shaft to extend out of the back of the motor as it is withdrawal. One advantage of this variant is that, because the screw shaft would never extend beyond the end of the crank, it would not need any commensurate cut-outs in the sphere or band to accommodate it. Also because the shaft would not be rotated, the inertial mass could be lower and critical speed problems would be less likely to arise.

In this embodiment the band system applies downward preload onto the sphere, pressing it into an annular socket ring defined in the housing 25. It is the socket that consequently establishes the reference position of the sphere. It is cut out to provide a window shown in FIG. 3 which provides space for the spindle to extend through it over as much of its theoretical articulation range as possible. This window accommodates the spindle shaft in swinging through its maximum tilt in one axis, and then that arc swings to its maximum tilt about an orthogonal intersecting axis. Because after the first swing, the tilt limits are closer to the axis of the second swing, the window is not symmetrical but in plan view would have vertical short sides 23 and subtended arc long sides 24.

The net articulation range is therefore the full "a" tilt taken through the full "b" tilt. The diagonal displaced angle is consequently greater than the individual maximum tilt angles.

The drives 7 and 8 ideally employ brushless servo motors. They can have integrated annular encoders that permit push-rod extension and hence subtended linkage angle to be deduced, but a preferred arrangement is to close the control loop around the absolute measured displaced angles.

Because the push-rods defined by the ball screw shafts act against the sphere or band at varying angles, such as in one embodiment +−40 degrees at their limits, their force and displacement gearing will change by cos 40 and 1/cos 40 respectively, i.e. it will push with around 77% of the maximum rotational force, but will move at around 130% of the speed. These effects can be taken into account by a smart servo controller.

Referring now to FIGS. 4 to 8, these show a second embodiment of the invention. In this embodiment, as will be described in detail hereinafter, a spindle unit housed in a sphere 4 is pivotally mounted in a gimbal ring 2 for tilting movement about one axis and the gimbal ring 2 is itself pivotally mounted in a mounting ring 1 for pivotal movement about an orthogonal axis. Drive motors 3 and 5 determine the movements of the sphere 4 relative to the gimbal ring 2 and of the gimbal ring 2 relative to the mounting ring 1.

As can be seen from FIGS. 4 to 8, the notional gimbal ring 2 ("notional" because though performing the function of a ring it is not in fact formed as a ring) lies orthogonal to the spindle axis C-C such that it can be pivotally supported by the mounting ring 1 about axis B-B. The gimbal ring 2 in turn supports the notionally spherical spindle unit 4 on a pivot axis orthogonal to the gimbal ring pivot axis A-A. The two orthogonal pivot axes A-A and B-B intersect at a common point through which the spindle axis C-C also passes orthogonal to the other axes.

A powered push rod system 3 is mounted on an extension of the gimbal ring 2 to push against the spindle sphere 4 causing the gimbal to pivot about the pivot axis A-A linking the sphere to the gimbal. A further powered push rod 5 is then mounted on the mounting ring 1 and pushes against the gimbal causing the gimbal to pivot about the pivot axis B-B linking the gimbal to the mounting ring.

The degree of tilt of the two axes is measured by attaching an encoder track 6 radially around the spindle sphere and fixing a read head 7 to the gimbal and by attaching an encoder track 8 to the gimbal and fixing a read head 9 to the mounting ring via an extended support 19.

The gimbal ring actually comprises a largely hemispherical shell with cut outs to provide for access to the spindle sphere and encoder track. It can then provide suitable mounting locations for the encoder read head 7, push rod drive unit 3 and push point 10 which works with the drive unit otherwise attached to the mounting ring 1.

The push rod system can be similar to the previous embodiment and comprises rotary drive units 3 & 5 that can be pivotally mounted about axes intersecting and orthogonal to the drive rotation axes. The drive units each support one end of respective ballscrews 12 & 13 with the ballscrews consequently acting as the push rods. Ballnuts 14 & 15 are then held such that they can pivot parallel to the drive units pivot axes and again with the pivot axes being orthogonal to the screws. They are held by mounting supports from the driven member 10 & 10. The drive units are mounted on extended supports 17 & 18 connecting them to the gimbal ring and mounting ring 1. The drive unit and captive ball nut unit pivots are all effected by a similar mechanical arrangement, such that a preload can be generated through the bearings to maintain stiffness. Bearing outer races are retained on either side of the units. Stub axles e.g. 21 & 23 extend inward from the mountings, being firmly retained against them by fastener arrays. On one side 2 a series pair of disc springs 2' push from a shoulder on the axles to the bearings inner race. On the other, the axle shoulder directly pushes against the inner races.

The services (power, air and liquid) are accommodated through 3 sets of 3 tubes 21 arranged as 3 spiral starts with the 3 tubes offset from each other normal to the central spindle sphere. At their start they attach to an extension 20 of the spindle sphere looping round towards the mounting ring where suitable connections can be effected.

The main pivot axes A-A and B-B are arranged with preload such that they push out from the spindle sphere to the gimbal ring, and pull out from the gimbal ring to the mounting ring. Referring to FIG. 8, the internal pivot axis A-A is effected by locating the outer races of bearings 5 & 5a in either side of the spindle sphere, and supporting the inner races on stub axles 3 & 3a otherwise firmly retained against the gimbal ring 10 with arrays of fasteners. Two disc springs in series 4 push from a shoulder on the stub axle to the inner race of the bearing on one side of the pivot axis. On the other side the disc springs are replaced by a spacer 11 that defines the axial offset. The external pivot axis B-B is effected by locating the outer race of the bearings 7 & 7a into the gimbal ring via ring extensions 5 & 5a. The inner races are supported on stub axles 1 & 1a with a disc spring 9 pushing between the axle and the inner race on one side and again an appropriate spacer 6 acting as the axial displacement reference on the other. The stub axles are pulled finally into the holders 2 & 2a on tapered shoulders by arrays of fasteners. The holders in turn are firmly retained in the mounting ring with further arrays of fasteners.

Having described the invention in the foregoing by reference to specific embodiments, it is to be appreciated that the embodiments are exemplary only and that modifications and variations are possible without departure from the spirit and scope of the invention. For example, the sphere in the described embodiment could be replaced by a disc or by any other means performing as described. It is for this reason that the term "notional ball" is used in some of the appended claims; the "ball" does not have to be a sphere.

The invention claimed is:

1. A mechanism comprising a motor providing rotation about a first axis mounted in a sphere which in turn is mounted in an arcuate member providing for rotation of the sphere about a second axis coaxial with that of the arcuate member, the arcuate member being mounted to be pivotable about a third axis orthogonal to said second axis and first and second drive means being provided for, respectively, effecting movement of said sphere relative to said arcuate member and effecting movement of said arcuate member about said third axis, wherein said first drive means is pivotally mounted on said arcuate member and rotates a first screw shaft acting against a first nut that is pivotally mounted on the sphere, and wherein said second drive means is pivotally mounted in relation to a fixed reference and rotates a second screw shaft acting against a second nut that is pivotally mounted on said arcuate member.

2. A powered mechanism able to articulate about first and second orthogonal tilt axes, comprising:

an arcuate member;

an element constrained by the arcuate member, the element being constrained such that it can only rotate relative to the arcuate member about the first axis; and a first motive source to displace one of the arcuate member and the element with respect to the other, wherein the arcuate member is also able to pivot about the second axis when a second motive source is applied from a fixed reference position, wherein the mechanism provides an output orthogonal to and intersecting the first and second tilt axes, wherein the first motive source to displace the element relative to the arcuate member is derived from a first motor that is pivotally mounted on the arcuate member and that rotates a first screw shaft acting against a first nut that is pivotally mounted on the element, and wherein the second motive source to articulate the arcuate member about said second axis is derived from a second motor that is pivotally mounted to a fixed reference position and that rotates a second screw shaft acting against a second nut that is pivotally mounted on the arcuate member.

3. A powered mechanism able to articulate about two orthogonal tilt axes where a ball is retained by at least one of a ring and band and constrained such that it can only rotate about their common axis and with a first motive source to displace one with respect to the other, and where the at least one of a ring and band is also able to pivot about an orthogonal intersecting axis when a second motive source is applied from a fixed reference position and such that the center line of a linkage output is significantly orthogonal to and intersecting the other two tilt axes, wherein the first motive source to displace the ball retained relative to the at least one of a ring and band is derives from a first motor that is pivotally mounted in the at least one of a ring and band and that rotates a first screw shaft acting a first nut that is pivotally mounted on the ball, and wherein the second motive source to articulate the at least one of a ring and band about said orthogonal intersecting axis is derived from a second motor that is pivotally mounted in relation to a fixed reference and that rotates a second screw shaft acting against a second nut that is pivotally mounted on the at least one of a ring and band.

4. A mechanism as claimed in claim 3, where the at least one of a ring and band is employed to hold the ball into an annular socket.

5. A mechanism as claimed in claim 3 where the at least one of a ring and band is preloaded against the ball and allowed to self center to axis support bearings.

6. A mechanism as claimed in claim 3, where an encoder scale is provided on the ball adjacent the at least one of a ring and band and means to read said scale is mounted on the at least one of a ring and band.

7. A mechanism as claimed in claim 3, where an encoder scale is supported in an arc around the at least one of a ring and band pivot axis and a means to read said scale is mounted against a fixed reference.

8. A mechanism as claimed in claim 3, where a motor is housed within the ball and the output employed as a cutting spindle.

* * * * *